(12) United States Patent
Dreischer et al.

(10) Patent No.: US 6,219,617 B1
(45) Date of Patent: *Apr. 17, 2001

(54) METHOD FOR DETERMINING THE ORBITAL POSITIONS OF SATELLITES IN LEO NETWORKS

(75) Inventors: Thomas Dreischer, Opfikon (CH); Johann Kellermeier, Neubiberg (DE)

(73) Assignee: Contraves Space AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/225,916

(22) Filed: Jan. 5, 1999

(30) Foreign Application Priority Data

Feb. 16, 1998 (CH) .................................... 0370/98

(51) Int. Cl.⁷ .............................. G01C 21/06; G06G 7/78
(52) U.S. Cl. ........................ 701/226; 342/355; 342/356; 342/357.16; 455/12.1; 455/13.2
(58) Field of Search ..................................... 701/226, 207, 701/223; 244/158 R, 176, 164, 168, 169, 172, 173; 455/12.1, 427, 13.1, 10, 69, 13.2, 13.3, 428, 429; 342/352, 354, 357.16, 359, 372, 357.15, 357.17, 355, 358, 356; 359/172, 152, 159

(56) References Cited

U.S. PATENT DOCUMENTS

| | | | |
|---|---|---|---|
| 4,375,697 | * | 3/1983 | Visher .................................. 455/13.1 |
| 4,691,882 | | 9/1987 | Young ................................ 244/158 R |
| 5,408,237 | * | 4/1995 | Patterson et al. ...................... 342/354 |
| 5,582,367 | * | 12/1996 | Castiel et al. ...................... 244/158 R |
| 5,788,187 | * | 8/1998 | Castiel et al. ...................... 244/158 R |
| 5,890,679 | * | 4/1999 | Chethik ............................. 244/158 R |
| 5,936,570 | * | 8/1999 | Ghazvinian et al. ................. 342/354 |
| 5,971,324 | * | 10/1999 | Williams et al. ................. 244/158 R |
| 5,979,830 | * | 11/1999 | Kellermeier ...................... 244/158 R |
| 5,999,127 | * | 12/1999 | Dezelan ................................ 342/359 |
| 6,009,306 | * | 12/1999 | Hargis ................................ 455/12.1 |

FOREIGN PATENT DOCUMENTS

| | | |
|---|---|---|
| 4243395 | 6/1993 | (DE) . |
| 0284075 | 3/1988 | (EP) . |

* cited by examiner

Primary Examiner—Jacques H. Louis-Jacques
(74) Attorney, Agent, or Firm—Townsend and Townsend and Crew, LLP; Guy W. Chambers, Esq.

(57) ABSTRACT

In order to achieve a considerable reduction of the outlay required on the ground in connection with the accurate calculation of the exact orbital position of each individual satellite of a constellation, first the exact orbital position of a preferably central master satellite of a sub-group of satellites embodied as a special formation is determined. This calculation is performed autonomously on board the satellite by means of customary measurements supported from the ground, or respectively by means of GPS, MANS, etc. Then the exact position of all other satellites in the same formation is determined from range and pointing data, which are provided by each IS link terminal. These pointing data are well known after the establishment of the inter- satellite link and are continuously updated.

9 Claims, 4 Drawing Sheets

☐ FORMATION I
△ FORMATION II
○ FORMATION III
==== INTERSATELLITE LINK
$P_x$ ORBITEBENE "X"

☐ FORMATION I
△ FORMATION II
◯ FORMATION III
≈≈≈≈ INTERSATELLITE LINK
$P_X$ ORBITEBENE "X"

METHOD FOR DETERMINING THE ORBITAL POSITIONS OF SATELLITES IN LEO NETWORKS

FIELD OF THE INVENTION

The invention relates to a method for determining the orbital positions of satellites in LEO networks with ring constellations. The invented method is usable everywhere in orbits that have the geometry of LEO satellite networks. The word "LEO", singular or plural, is employed interchangeably herein to refer to any orbital altitude, e.g.also in "MEO" and not to Low Earth Orbits alone.

BACKGROUND OF THE INVENTION

Inter-satellite links are used in connection with communications satellite systems, which are moving in low earth orbits (LEO) and relate to so-called global communications networks, in order to connect the individual satellites of the system in the manner of a "network in the sky". Many satellite systems have already been planned or are even under construction. Satellites, which permit real time transmission of data, sound and video and are known as "big LEOs", are particularly important for the present invention. Examples of this are the so-called IRIDIUM and CELESTRI systems, originally introduced by Motorola, the TELEDISC system of Microsoft and McCaw Corp. It is expected that these systems will be functional around the year 2005.

The use of inter-satellite links (ISL), besides the customary earth links (downlinks and uplinks, i.e. from the satellite to the ground or vice versa), distinguishes the above mentioned LEO systems from others, such as GLOBALSTAR (by Globalstar Telecomms. Ltd.).

The main purpose of the global real time satellite communications networks lies in assuring a variable time-dependent transmission capacity to any location in the entire world when needed. Such a dynamic communications network requires real time management. In addition, a universal and easy access to the network is demanded when a wireless access is offered such as is the case, for example, with IRIDIUM. The determination of the exact orbital positions of all satellites is performed by the ground station.

Customarily the maintenance and control of an orbit of a satellite is controlled from the ground. The required orbital adjustment is calculated by the ground station, and a number of commands is generated and uplinked to the satellite, which are then downlinked again for checking. Finally, the ground station transmits a command for starting the control commands and the satellite performs them by using its own cycle generated on board. Such a sequence protects the satellite against transmission errors, since often it is out of sight of the ground station.

Recently autonomous navigation systems have aided in making an autonomous maintenance of the orbit possible, efficient and dependable. These systems can be aided by GPS, or can operate completely independently (MANS by Microcosm). In connection with LEO communications networks, the economical aspect of maintaining the orbit and the constellation are of decisive importance, since a large number of satellites—up to several hundred—must be controlled simultaneously.

The so-called checked autonomy, wherein the orbital maneuvers are initially calculated on board of each satellite, but are only executed after a check by the ground station, is a mechanism for reducing the risks and for utilizing the autonomy in maintaining the orbit.

The greater portion of the LEO satellite networks mentioned above consists of several orbital planes at the same height all around the earth. Generally all orbits of an LEO network have the same inclination in respect to the equator. The same number of satellites is distributed at the same distances from each other in each orbital plane. Such constellations are called "Walker" orbits. The total number of satellites, followed by the number of orbital planes and the inclination of the orbital plane, are characteristics, which permit a differentiation between all existing LEO network concepts.

There are sub-groups within a satellite network, which each have a predetermined number—between four and eight—satellites connected with each other for the mentioned communications purposes. Viewed from a satellite in the center of such a sub- group, two types of inter-satellite links can be distinguished: "inter-satellite links within the plane", i.e. links with satellites, which are ahead or behind, but in the same plane, and "inter-satellite links between the planes", i.e. links with satellites located in an adjacent plane or in a plane adjacent to the latter. An additional characteristic of each satellite network is expressed by the so-called "phase between the planes", the angular displacement, which constantly results during the course, between a central satellite of a sub-group and an adjacent satellite in the directly adjacent orbital plane.

An important problem, which results normally in each real time LEO satellite network operating with a fixed "phase between the planes", is to assure that the satellite of the same sub-group always remain in the same relation toward each other. This requirement is the result of the need to overlap the covered ground zones.

The employment of navigation methods performed or supported from the ground for monitoring the large number of satellites in LEO networks represents a relevant cost factor in maintaining the orbits during the working phase of an established satellite network.

OBJECT OF THE INVENTION

It is therefore the object of the present invention to create a method of the type mentioned at the outset, which is less expensive in maintaining the orbit during the working phase of an established satellite network.

DETAILED DESCRIPTION

Figure 1:
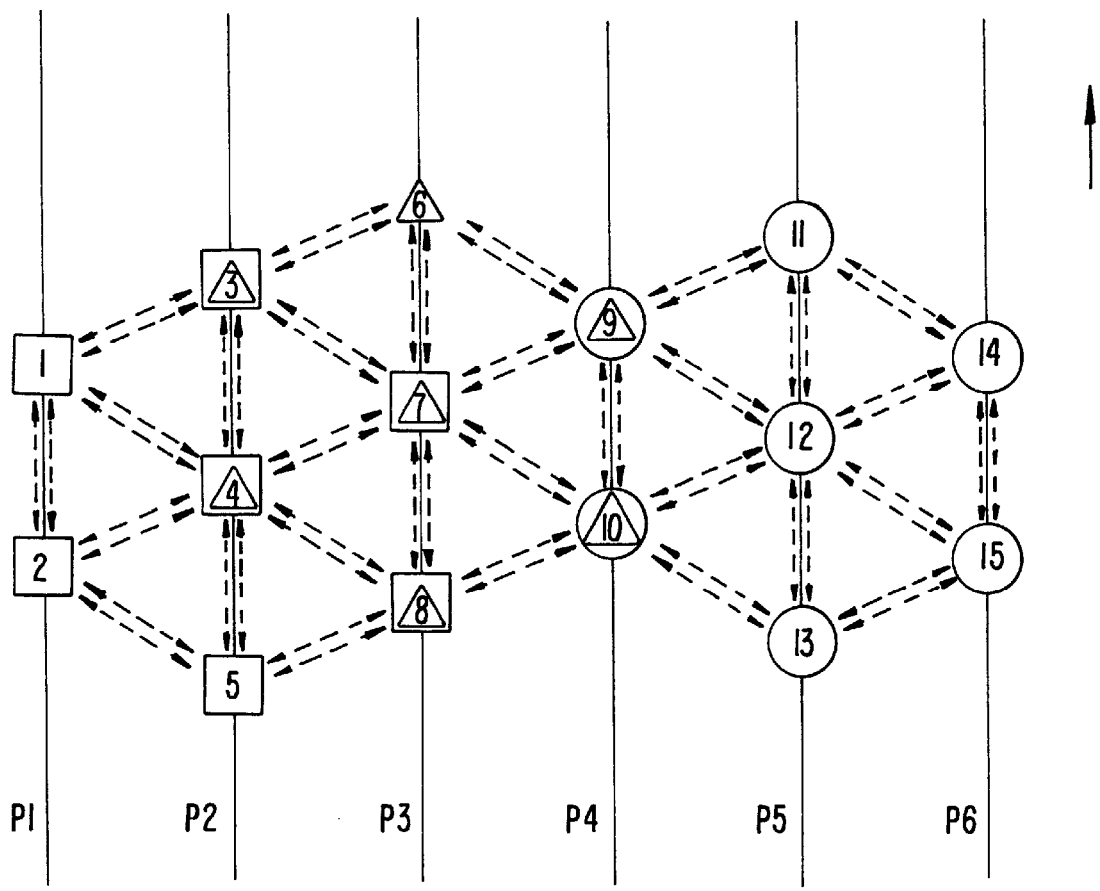
FIG. 1 is a schematic representation of the linkage of individual formations with each other in accordance with the invention.

Six orbits are represented in FIG. 1 by respectively one orbital line P1 to P6. Several satellites can move one after the other in each orbital plane at approximately even spacings. Only some of these many possible satellites are represented in FIG. 1, namely satellites 1 and 2 in orbit P1, satellites 3, 4 and 5 in orbit P2, satellites 6, 7 and 8 in orbit P3, satellites 9 and 10 in orbit P4, satellites 11, 12 and 13 in orbit P5 and satellites 14 and 15 in orbit P6.

Figure 2:
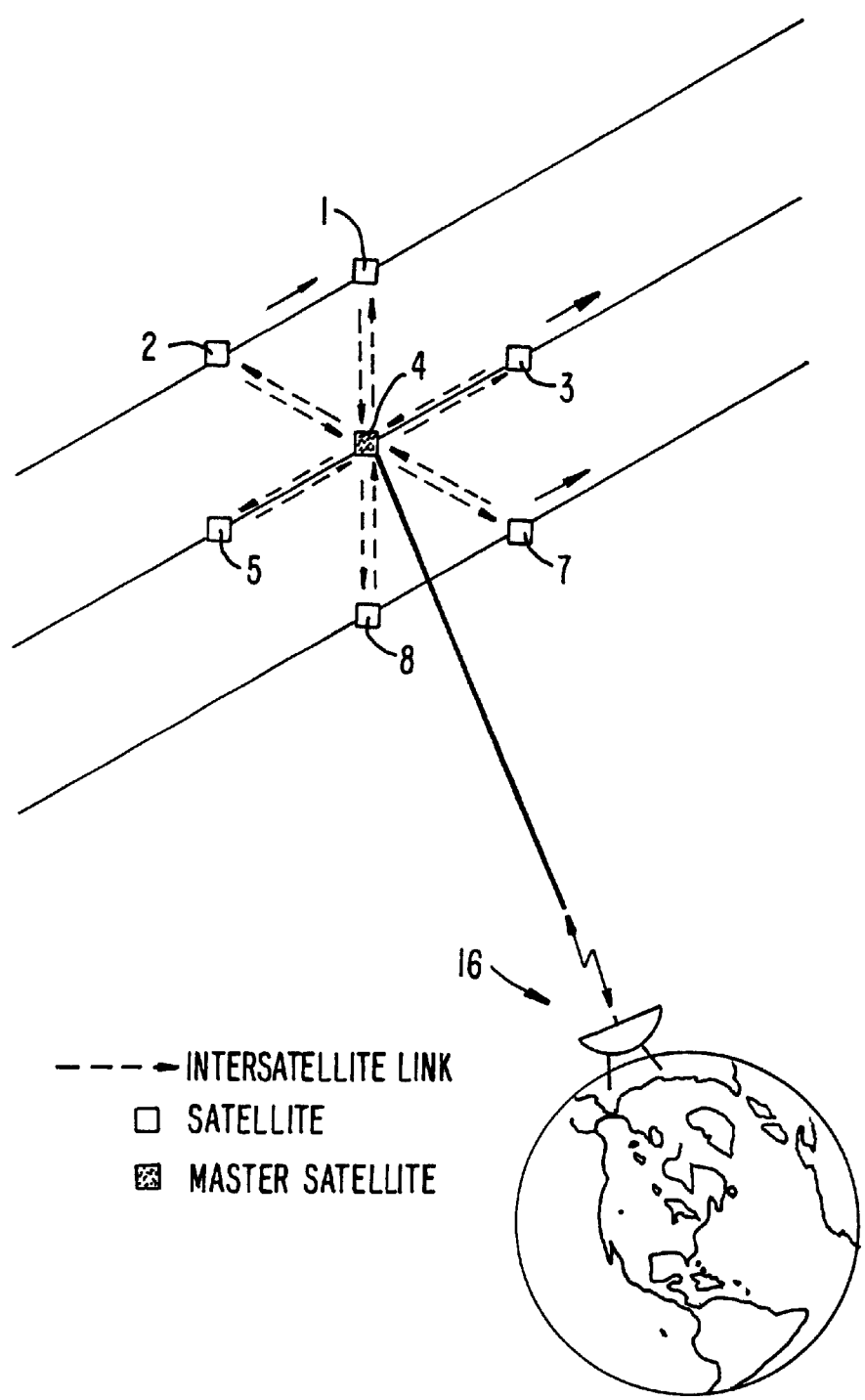
FIG. 2 is a schematic representation of a satellite formation in accordance with the invention, having a master satellite, which communicates with a ground station.

The satellites 1 to 5, 7 and 8 are individually represented in FIG. 2. The satellite 4, which is in a central position, is selected as the master satellite in the sense of the invention, so that it is connected, respectively bidirectionally, via earth links with a ground station 16, and via IS links with the other satellites.

Therefore, satellites 1 and 2 form a first ring constellation, satellites 3, 4 and 5 a second ring constellation, and satellites 7 and 8 a third ring constellation. Generally, a satellite network in accordance with the invention is formed from at least two ring constellations, which all orbit at the same orbital altitude, wherein a ring constellation consists of at least two satellites which circle in the same, in most cases circular, orbit at a defined fixed angular offset in respect to each other.

The satellites 3, 4 and 5 of the second ring constellation form a sort of a communications ring in their orbit, because they are connected with each other via IS links. Inter alia, the present invention is based on the knowledge that miniaturized optical terminals, in combination with a specific terminal accommodation on board the satellite (Swiss Patent Application 1153/97), which is incorporated by reference make possible uninterrupted inter-satellite communications not only between satellites in the same orbit, but also between a master satellite and the individual satellites of other adjacent ring constellations. In the sense of the present invention, the linkage between individual satellites of a ring constellation and individual satellites of other adjacent ring constellations is considered to be a "formation". This brings the advantage that, in addition to the actual communications purposes, the realization of a very inexpensive, permanent, constantly updated information regarding the respective course positions of all satellites of the respective formation becomes possible, wherein this information can also be used to maintain an exact "phase between the planes" of all satellites in a formation.

When using continuous inter-satellite communications as described above, inter-satellite links can be supported by computations performed in the master satellite in order to achieve a considerable reduction of the outlay required on the ground in connection with the accurate calculation of the exact orbital position of each individual satellite of the constellation.

To achieve this goal, first the exact orbital position of the preferably central master satellite in a formation is determined, and this autonomously on board the satellite by means of customary measurements supported from the ground, or respectively by means of GPS, MANS. Then the exact position of all other satellites in the same formation is determined from range and pointing data, which must be provided by each IS link terminal (FIG. 2). These pointing data are well known after the establishment of the inter-satellite link and are continuously updated.

Since at least one satellite of a network is always in contact with the ground station, any required information regarding each satellite of this network is always available in that a suitable route is formed via the various inter-satellite links, and this even when the satellite of interest is not within the sight range from the ground station.

FIG. 1 shows that a satellite network can be considered to consist of several formations, which together constitute the entire network. Although all satellites can be designed in the same manner, in FIG. 1 the satellites of the first formation are represented by small square ideograms, the satellites of the second formation in a similar manner by triangles, and the satellites of the third formation by circles.

Thus, it can be seen from the drawings that the satellites 3, 4, 7 and 8 participate both in the first and the second formation, and that the satellites 9 and 10 are members of the second and third formation. It is practical to select the satellites 4, 7 and 12 as master satellites in this example. The determination of the orbital position of the master satellites of a formation is provided by the use of traditional methods from a ground station, or respectively by the employment of GPS or MANS.

The exact orbital positions of all satellites of a formation are determined in that use is made of the information from the respective inter-satellite link between the central master satellite of the formation and a satellite of interest from this formation. Customarily this inter-satellite information consists of range information, range-rate information and angle information in the pointing direction (azimuth and elevation). If the actual angle between the inter-satellite terminal of the master satellite and the satellite of interest is known, it is possible to determine from this the pointing vector from the master satellite to the satellite of interest.

In particular, the inter-satellite range information is extremely useful in connection with LEO networks with fixed inter-satellite phases, for example IRIDIUM or CELESTRI. By monitoring the range information of an inter-satellite link it is possible to predict whether the satellites of a formation are in fixed states in respect to each other, or whether relative movements take place. Therefore, by monitoring of the inter-satellite range information it is possible to compensate for mutual relative movements between the satellites. Such a longtime drift is mainly caused by the effects of the sun, the moon and possibly the atmosphere. Since such a prediction is very sensitive, it is possible to perform small corrective maneuvers by means of the drive jets of the satellites before positional errors become cumulative.

By means of the invention it was learned that in theory, when using p formations in a network consisting of k satellites, the outlay for measurements which must be performed in the ground station to determine the exact orbital positions of all k satellites can be reduced by the factor k/p. It is not possible in actuality to attain this value, since each network has an edge, which constitutes a border of the network and therefore also a geometric interruption thereof. Therefore some additional inter-satellite links are necessary for determining the positions of the satellites of a constellation which are located in the vicinity of the edge.

The additional information regarding the pointing (alignment) data of all inter-satellite terminals of a master of a formation—including values regarding distances, angles and their chronological derivations of $d/dt$ and $d^2/dt^2$—permit an improvement of the accuracy of one and the same position measurement by overlaying all pointing data. As a rule, formations consist of five to nine satellites. Based on an improvement by the factor n with n pointing data sets involved in the position determination, an improvement of the accuracy by a factor of 2.2 up to a factor of 3 results.

The presence of on-board computers in all satellite types of LEO networks makes it possible to let the satellite perform a running update and storage of its position and pointing data sets autonomously, preferably during times of reduced activity, or respectively reduced burdening by other satellite sub-systems.

In case a satellite in a formation ceases to operate, it is nevertheless possible to determine the position of all other satellites. Even if the central satellite of a formation fails, a new master can be chosen from one of the adjacent satellites.

An inherent redundancy of satellite networks results because each satellite normally is connected by more than one inter-satellite link with other adjacent satellites. Therefore every inter-satellite link can determine the exact position of a satellite via an interpositioned master. From the similarity of the structure of all satellites of a network arises the possibility of selecting, in response to the requirements, any satellite as the master of a formation. Therefore, an exact position determination of all satellites of a formation is made possible in an excellent manner by means of the ring-overlapping continuous connection of all satellites of a formation.

Figure 3:
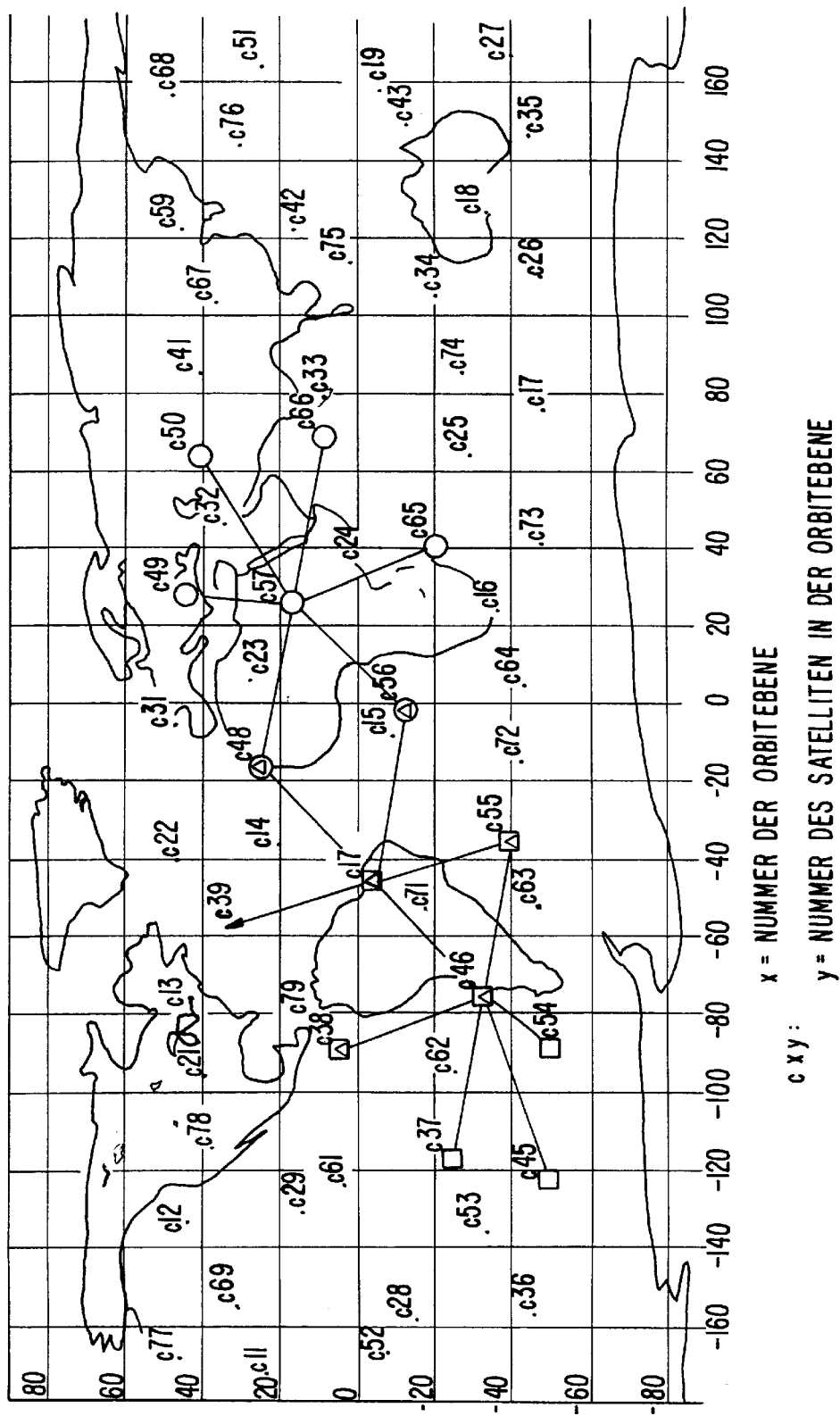
FIG. 3 is a schematic representation by means of the example of the CELESTRI system of individual formations in accordance with the invention.

FIG. 3 shows some formations of the CELESTRI LEO network. From this it is possible to see that the geometric satellite network is built up of ring constellations, and that a communications network consists of ring-overlapping formations.

Figure 4:
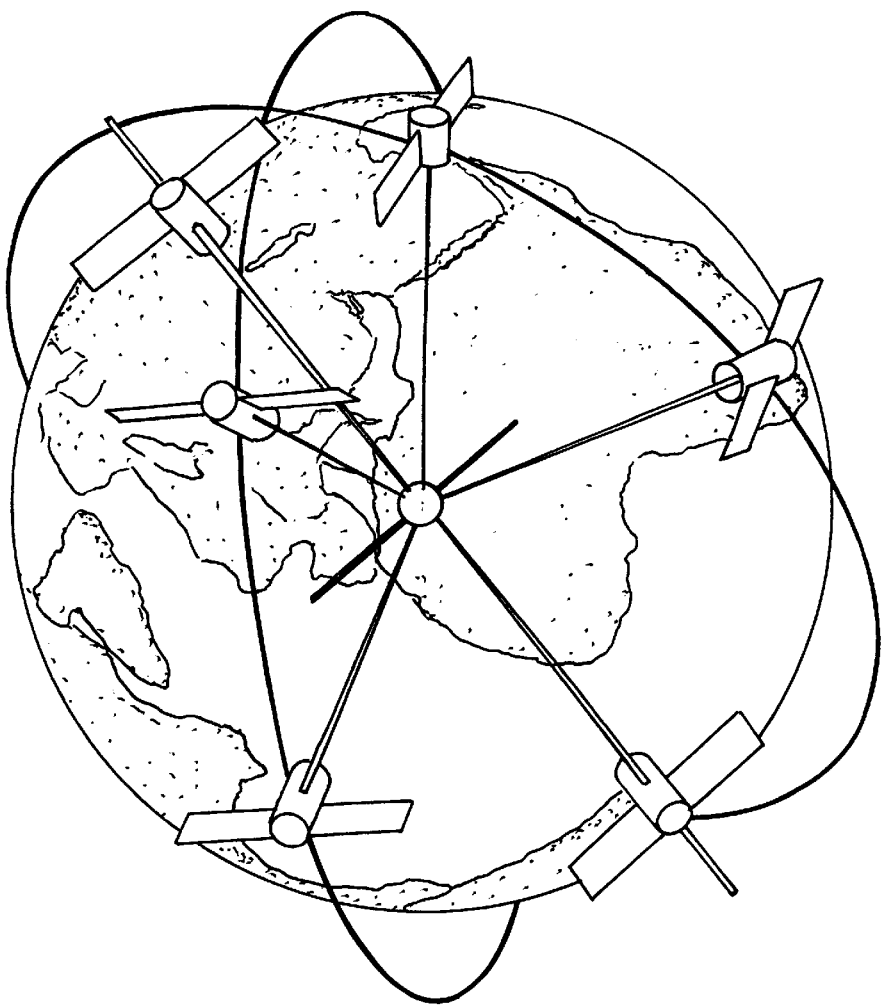
FIG. 4 is a schematic representation by means of the example of the CELESTRI system of a formation in accordance with the invention with a continuous ISL connection during the crossing of the orbital planes.

By means of a CELESTRI example, FIG. 4 shows that a continuous ISL connection within a formation is also possible even when orbital planes are crossed.

The long-term monitoring of all pointing data of the inter-satellite links of a master can in addition be used for transmitting control signals for the orbital correction to the satellite of the respective inter-satellite link when a defined tolerance threshold has been exceeded.

What is claimed is:

1. A method for determining the orbital positions of satellites arranged in ring constellations within satellite formations, comprising the steps of:

designating a first satellite formation from two or more ring constellations, designating one satellite from said first satellite formation as a first satellite formation master satellite, periodically bringing said first satellite formation master satellite into bidirectional communication with a ground station, bringing said first satellite formation master satellite into bidirectional communications with the other satellites of said first satellite formation by means of interruption-free optical inter-satellite links, designating a second satellite formation from two or more ring constellations wherein at least one of the satellites in said second satellite formation is also a member of said first satellite formation, designating one satellite from said second satellite formation as a second satellite formation master satellite and periodically bringing said second satellite formation master satellite into bidirectional communication with a ground station, bringing the satellites in said second satellite formation into bidirectional communications with other satellites of said second satellite formation by means of interruption-free optical inter-satellite links, using said at least one satellite within both said first and second satellite formations to establish interruption-free optical inter-satellite links between said first and second satellite formations, and, using said optical inter-satellite links to allow either said first or second satellite formation master satellite to collect informational data from other satellites in said first and second satellite formations to share with said ground station in order to determine desired orbital positions for satellites in said first and second satellite formations.

2. The method in accordance with claim 1 wherein at least one of said first or second master satellites always remains in communication with the ground station.

3. The method in accordance with claim 1, wherein the informational data collected by said master satellite includes range information, pointing data information and angle information in the pointing direction.

4. The method in accordance with claim 1, wherein initially the exact orbital position of a master satellite of a formation is determined by means of measurements supported from the ground, and then the exact position of all other satellites of the same formation is determined from the range and pointing data collected by the master satellite from these other satellites.

5. The method in accordance with claim 1, wherein the master satellite uses informational data collected from other satellites and data shared with said ground station to send any needed control signals to correct the position of said other satellites.

6. The method in accordance with claim 1 wherein positions of the satellites are determined by means of average values from several different pointing data sets.

7. The method in accordance with claim 1, wherein all satellites in a formation perform a running update and storage of the informational data containing position and pointing data sets from all other satellites within its formation.

8. The method in accordance with claim 1, wherein each formation consists of four to twelve satellites.

9. The method in accordance with claim 1, wherein a continuous ISL connection within each formation is maintained during crossing of orbital planes.

* * * * *